United States Patent
Cabrita Condessa et al.

(10) Patent No.: US 12,462,159 B2
(45) Date of Patent: Nov. 4, 2025

(54) METHODS AND SYSTEMS FOR TRAINING A MACHINE LEARNING MODEL WITH MEASUREMENT DATA CAPTURED DURING MANUFACTURING PROCESS

(71) Applicant: Robert Bosch GmbH, Stuttgart (DE)

(72) Inventors: Filipe J. Cabrita Condessa, Pittsburgh, PA (US); Devin T. Willmott, Pittsburgh, PA (US); Ivan Batalov, Pittsburgh, PA (US); João D. Semedo, Pittsburgh, PA (US); Wan-Yi Lin, Wexford, PA (US); Jeremy Kolter, Pittsburgh, PA (US); Jeffrey Thompson, Stuttgart (DE)

(73) Assignee: Robert Bosch GmbH (DE)

( * ) Notice: Subject to any disclaimer, the term of this patent is extended or adjusted under 35 U.S.C. 154(b) by 779 days.

(21) Appl. No.: 17/842,041

(22) Filed: Jun. 16, 2022

(65) Prior Publication Data

US 2023/0409916 A1     Dec. 21, 2023

(51) Int. Cl.
*G06F 16/00* (2019.01)
*G06N 3/084* (2023.01)

(52) U.S. Cl.
CPC .................................. *G06N 3/084* (2013.01)

(58) Field of Classification Search
CPC ............... G06F 16/221; G06F 16/2228; G06F 16/2282; G06F 16/244; G06F 16/24575; G06F 16/24578; G06F 21/50; G06F 21/55; G06F 21/552; G06F 21/554; G06F 2209/5017; G06F 2221/034; G06F 9/45508; G06F 9/5033; G06F 9/5066; G06N 20/00; G06N 3/045; G06N 3/044; G06N 3/047; G06N 3/048; G06N 3/084; G06N 5/022;

(Continued)

(56) References Cited

U.S. PATENT DOCUMENTS

| | | | |
|---|---|---|---|
| 10,728,282 B2 * | 7/2020 | Mestha | G06N 20/00 |
| 2022/0300518 A1 * | 9/2022 | Bigaj | G06F 16/2282 |

(Continued)

OTHER PUBLICATIONS

Gardner, "Exponential smoothing: The state of the art—Part II", International Journal of Forecasting 22 (2006), Texas, 30 pages.

(Continued)

*Primary Examiner* — Shyue Jiunn Hwa
(74) *Attorney, Agent, or Firm* — Dickinson Wright PLLC

(57) ABSTRACT

Methods and systems for training a machine learning model with measurement data captured during a manufacturing process. Measurement data regarding a physical characteristic of a plurality of manufactured parts is received as measured by a plurality of sensors at various manufacturing stations. A time-series dynamics machine learning model encodes the measurement data into a latent space having a plurality of nodes. Each node is associated with the measurement data of one of the manufactured parts and at one of the manufacturing stations. A batch of the measurement data can be built, the batch include a first node and a first plurality of nodes immediately connected to the first node via first edges, and measured in time earlier than the first node. A prediction machine learning model can predict measurements of a first of the manufactured parts based on the latent space of the batch of nodes.

20 Claims, 4 Drawing Sheets

(58) Field of Classification Search
CPC .......... G06N 5/04; G16B 30/20; G16B 40/00; G16H 10/40
See application file for complete search history.

(56) References Cited

U.S. PATENT DOCUMENTS

2022/0344049 A1* 10/2022 Hall ...................... G06F 9/5066
2022/0359041 A1* 11/2022 Lee ........................ G16H 10/40

OTHER PUBLICATIONS

Brown et al., "Language Models are Few-Shot Learners", arXiv:2005.14165v4 [cs.CL] Jul. 22, 2020, 75 pages.

José Manuel Navarro González et al., "Root Cause Analysis of Network Failures Using Machine Learning and Summarization Techniques," IEEE Communications Magazine, Sep. 2017, pp. 126-131.

Negin Javanbakht et al., "Alarm-Based Root Cause Analysis in Industrial Processes Using Deep Learning," arXiv:2203.11321v1 [eess.SY] Mar. 21, 2022, 19 Pages.

Lisa Abele et al., "Combining Knowledge Modeling and Machine Learning for Alarm Root Cause Analysis," 7th IFAC Conference on Manufacturing Modelling, Management, and Control International Federation of Automatic Control, Jun. 19-21, 2013, Saint Petersburg, Russia, pp. 1843-1848.

* cited by examiner

METHODS AND SYSTEMS FOR TRAINING A MACHINE LEARNING MODEL WITH MEASUREMENT DATA CAPTURED DURING MANUFACTURING PROCESS

TECHNICAL FIELD

The present disclosure relates to methods and systems for training a machine learning model with manufacturing data.

BACKGROUND

Supervised machine learning has shown success in many domains, such as image classification, automatic speech recognition, visual question answering, and text-to-text translations. However, training a supervised model for every new task requires a large set of labeled examples, which limits the applicability of such models. Nevertheless, some tasks or data types could be difficult or very expensive for human annotation, for example, time series anomalies and text summarization. Conversely, if there is a large amount of unlabeled data from one domain, it is possible to learn correlations and representation of the data without requiring the use of highly expressive models.

In a manufacturing setting, measurements may be taken of the manufactured part at each station of the manufacturing facility. One or more sensors may be used to measure the physical quality, dimensions, strength, roughness, or other desired characteristic of the manufactured part.

SUMMARY

In one embodiment, a computer-implemented method of training a machine learning model with measurement data captured during a manufacturing process includes the following steps: receiving measurement data regarding a physical characteristic of a plurality of manufactured parts as measured by a plurality of sensors at various manufacturing stations; via a time-series dynamics machine learning model, encoding the measurement data into a latent space having a plurality of nodes, each node associated with the measurement data of one of the manufactured parts as measured at one of the manufacturing stations; via a prediction machine learning model, determining a predicted measurement of a first of the manufactured parts at a first of the manufacturing stations based on the latent space of at least some of the measurement data not including the measurement data corresponding to the first manufactured part at the first manufacturing station; via the machine learning model, comparing the prediction measurement of the first manufactured part to the measurement data of the first manufactured part at the first manufacturing station; based on a difference between the prediction measurements and the actual measurement data, updating parameters of the machine learning model until convergence; and based upon the convergence, outputting a trained machine learning model with the updated parameters.

In another embodiment, a system of training a machine learning model with measurement data captured during a manufacturing process is provided. The system includes a plurality of sensors located at a plurality of manufacturing stations, each sensor configured to produce measurement data indicating a physical characteristic of a plurality of manufactured parts passing through a respective one of the manufacturing stations. The system also includes at least one processor programmed to do the following: execute a time-series dynamics machine learning model to encode the measurement data into a latent space having a plurality of nodes, each node associated with the measurement data of one of the manufactured parts as measured at one of the manufacturing stations; execute a prediction machine learning model to determine a predicted measurement of a first of the manufactured parts at a first of the manufacturing stations based on the latent space of at least some of the measurement data not including the measurement data corresponding to the first manufactured part at the first manufacturing station; compare the prediction measurement of the first manufactured part to the measurement data of the first manufactured part measured at the first manufacturing station; based on a difference between the prediction measurements and the actual measurement data, updating parameters of the machine learning model until convergence; and based upon the convergence, output a trained machine learning model with the updated parameters.

In yet another embodiment, a computer-implemented method of training a machine learning model with measurement data captured during a manufacturing process includes the following steps: receiving measurement data regarding a physical characteristic of a plurality of manufactured parts as measured by a plurality of sensors at various manufacturing stations; via a time-series dynamics machine learning model, encoding the measurement data into a latent space having a plurality of nodes, each node associated with the measurement data of one of the manufactured parts as measured at one of the manufacturing stations; batching the measurement data to build a batch including a first plurality of nodes that are immediately connected to the first node via first edges and measured in time earlier than the first node, and a second plurality of nodes wherein each of the second plurality of nodes are immediately connected to, and measured in time earlier than, a respective one of the first plurality of nodes via second edges; and via a prediction machine learning model, determining a predicted measurement of a first of the manufactured parts at a first of the manufacturing stations based on the latent space of the batch of nodes.

DETAILED DESCRIPTION

Figure 1:
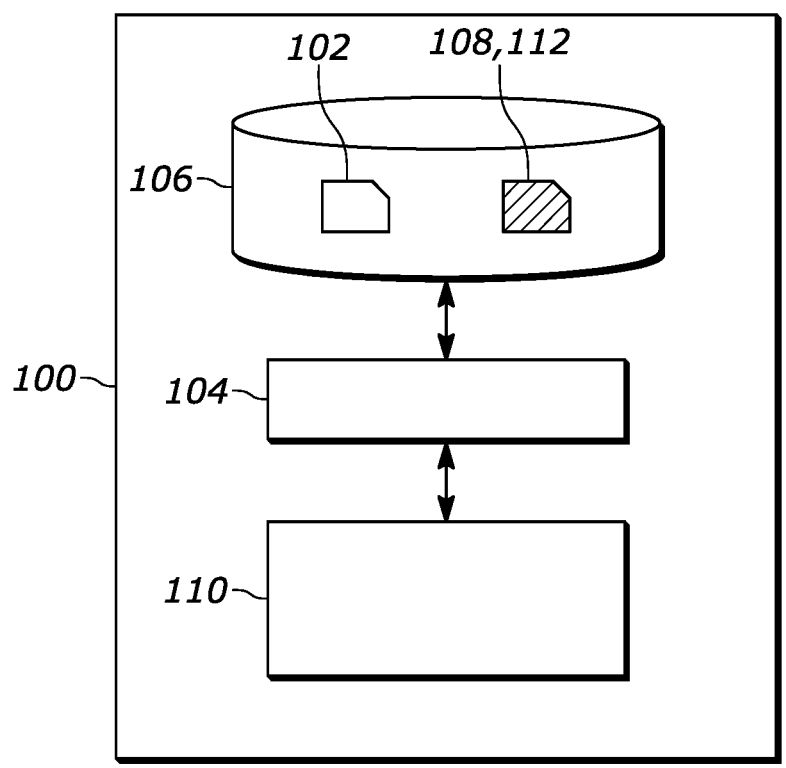
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Supervised machine learning has shown success in many domains, such as image classification, automatic speech recognition, visual question answering, and text-to-text translations. However, training a supervised model for every new task requires a large set of labeled examples, which limits the applicability of such models. Nevertheless, some tasks or data types could be difficult or very expensive for human annotation, for example, time series anomalies and text summarization. Conversely, if there is a large amount of unlabeled data from one domain, it is possible to learn correlations and representation of the data without requiring the use of highly expressive models.

Such learned correlations and representations can be used directly, or can be fine-tuned for downstream tasks (for example, a set of tasks of relevance to an end-user for which the model is not directly trained). This approach can significantly outperform training the model end-to-end from random initialization. Such performance gain is especially significant for sequence models, such as natural language processing (NLP) and for models with larger capacity. Several pre-trained models are available for perception data (e.g., natural languages and images), but there is no such model for multimodal structural manufacturing data modeled over multi-dimensional sequences.

According to various embodiments described herein, this disclosure provides systems and methods to learn representational features of manufacturing data by training an unsupervised auto-regressive graphical model. Multimodal structured data (including, but not limited to, tabular, time series, and aggregate statistics) is modeled on a multitype directed graph. Sequence models can be extended from a single dimension (textual sequences) into multiple dimensions (directed graphs). Vertices (nodes) of the directed graph represent records associated with the passage of a physical component through a manufacturing station (e.g. records associated by laser etching a component, optical inspection results of a component, stress-strain curve of a component, etc.). Two nodes are connected by a directed edge if they correspond to (1) records associated with a particular component visiting consecutive stations, or (2) records associated with consecutive components going through the same station. These two edge-construction mechanisms are the foundation for the construction of this two-dimensional bidirectional graph associated with the manufacturing process.

The disclosed systems and methods rely on machine learning models, such as neural networks (e.g., deep neural networks (DNN), graphical neural networks (GNN), deep convolutional networks (DCN), convolutional neural networks (CNN), etc.) and the like. FIG. 1 shows a system 100 for training a neural network, e.g., a graphical neural network. The neural networks illustrated and described herein merely examples of the types of machine learning networks or neural networks that can be used. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input the output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network. This data may also be referred to as trained model data 112. For example, as also illustrated in FIG. 1, the output interface may be constituted by the data storage interface 104, with said interface being in these embodiments an input/output (10') interface, via which the trained model data 112 may be stored in the data storage 106. For example, the data representation 108 defining the 'untrained' neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 4:
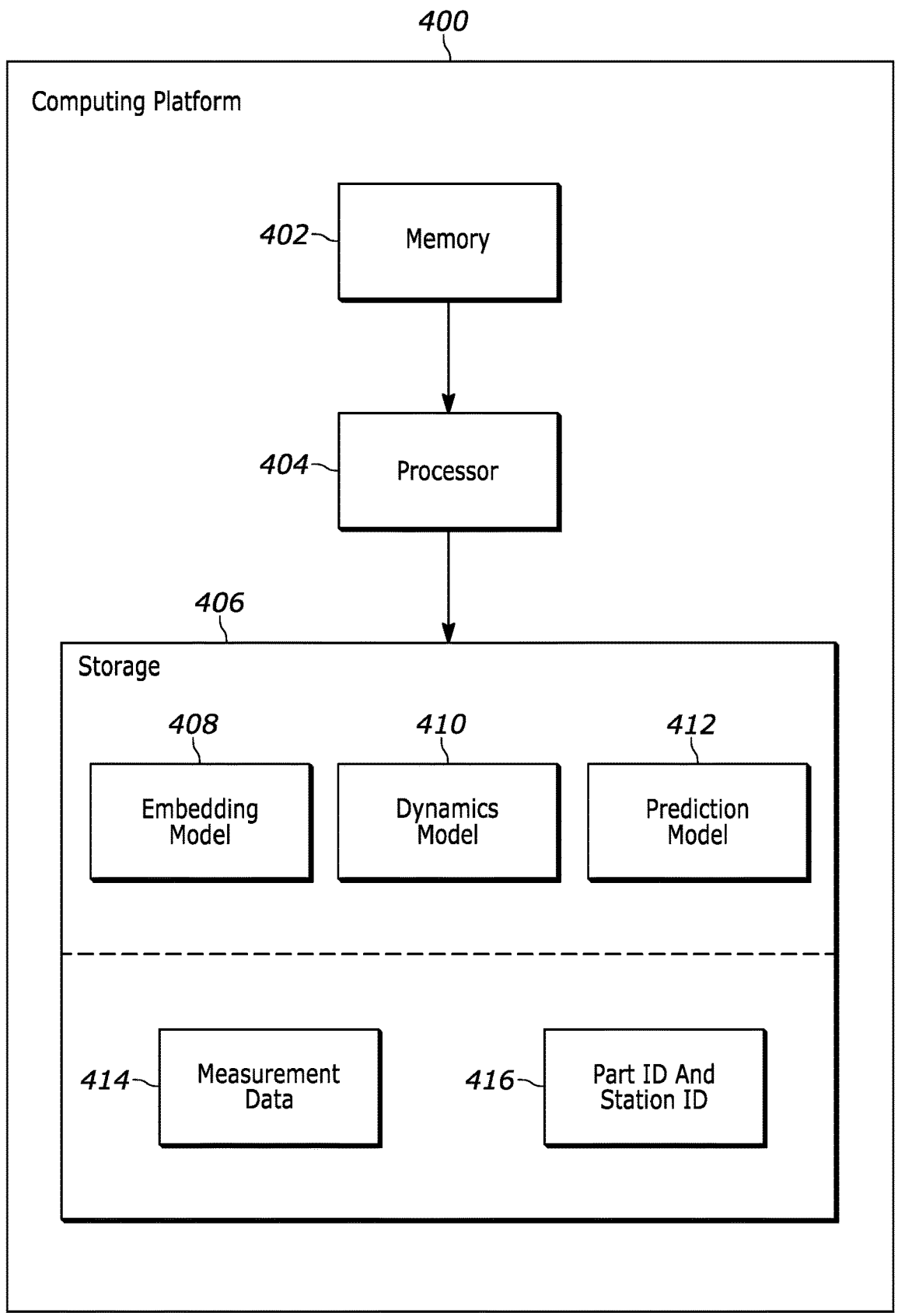
FIG. 4 shows a schematic diagram of a computing platform that may be utilized to implement the models disclosed herein, for example the graphical machine learning model of FIG. 3.

The structure of the system 100 is one example of a system that may be utilized to train the neural networks described herein. Additional structure for operating and training the machine learning models is shown in FIG. 4, described later.

Regarding manufacturing processes, a final product may go through several work stations before the part is completely finished or manufactured. For example, before a final product is produced, it may first need to be assembled with other sub-components, painted, laser etched, strength tested, or other manufacturing tasks. After each station completes its tasks, measurements may be taken of the part to produce measurement data. This makes sure the part is sufficiently operational, sufficiently connected, sufficiently sized, etc. Measurement data may include which type of station the measurement is taken, which type of part is being measured, and what is the measurement. The measurement can be a binary value, a strength value, a time series value (e.g., a measurement of the response to pressure), floating precision number, number string, integer, Boolean, aggregation of statistics, or the like which represents a physical state or characteristic of the part. This measurement data can be multimodal (e.g., may include multiple types of measurements, such as those listed above as an example). This multimodal measurement data may be input into a neural network described herein. Depending on the measurements taken at the station, the system can determine if the part is sufficient, or instead should be binned or discarded.

This multimodal measurement data inputted in a graph neural network can yield various benefits and can yield a plethora of information that can help manufacturing lead time and logistics. For example, the output of the neural network can yield predictions as to whether the parts will be sufficient for production or assembly into another system, predictions as to whether stations are going to be needed to be offline, predicting yield time, as well as predictions as to where a failure may have occurred along the manufacturing line, why the failure occurred, and the like. In another example, the output of the neural network can yield predicted measurements at any station along the manufacturing line; given this information, one can remove a station (or procedure within that station) devoted to measuring the component being manufactured. This can save time and money in measuring.

Also, predictive measurements of the manufactured part along the manufacturing line can reduce costs associated with scrapping a component. If a measurement of a component can be estimated within the manufacturing line (e.g., at or between every manufacturing station), this can lead to a more precise determination of when a failure or misstep in manufacturing takes place. This can mean scrapping a component earlier in the manufacturing process before it becomes more expensive to do so. Also, depending on when a component is actually measured along the manufacturing process, predicting the measurement of a component before the component is actually measured allows the component to be scrapped earlier in the manufacturing process.

Figure 2:
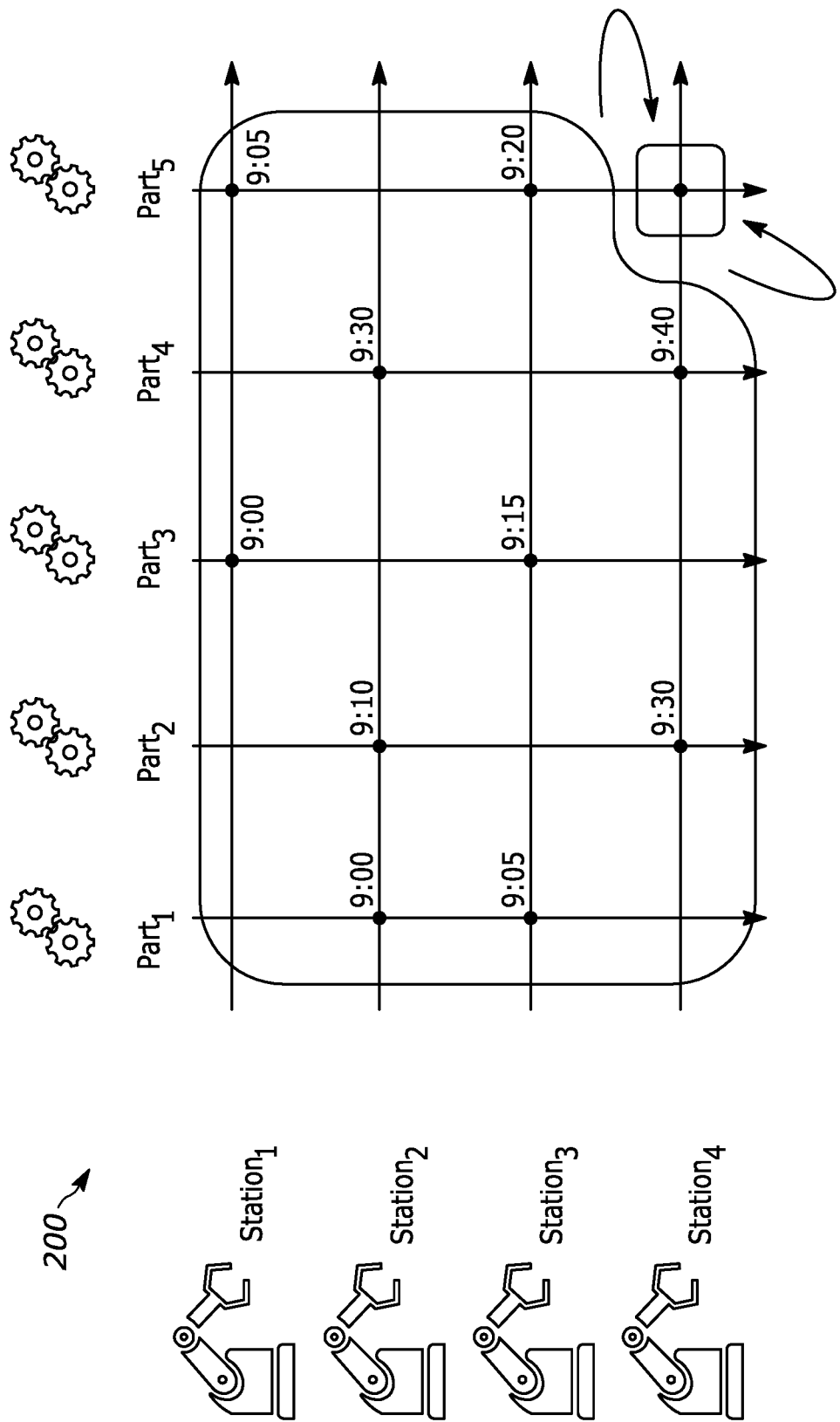
FIG. 2 shows a schematic of a time-ordered, directed graph model, with nodes denoting measurements or records associated with a particular part at a particular station, according to an embodiment.

According to the system described herein, the models can be provided with a latent representation of the manufactured parts and the station each part is measured at. FIG. 2 shows a mesh or graphical representation 200 of this data. Each time a particular part gets to a station, the system updates the latent representation. Here, each black circle denotes multimodal measurements or records associated with parts passing through a station. Each black circle is also provided with a time stamp, indicating a time in which each part particular part is measured at that particular station. In the illustrated scenario, the following measurements occur: part1 is measured at station2 at 9:00, and is measured at station3 at 9:05; part2 is measured at station2 at 9:10, and is measured at station4 at 9:30; part3 is measured at station1 at 9:00, and is measured at station3 at 9:15; part4 is measured at station2 at 9:30 and is measured at station4 at 9:40; part5 is measured at station1 at 9:05 and is measured at station3 at 9:20. Before each part is measured, it is in its initialized state, and then works with station2's latent state to produce the multimodal measurements explained above. This illustrated graphical representation of this data may be only a portion of the overall measurements taken; more or less than five parts may be measured, and more or less than four stations may be provided for measurements. The arrows in the graph show the time progression for each part (going top to bottom), and for each station (going left to right). The black circle at the intersection of part5 and station4 may denote the auto regressive problem on which this disclosure is based— being able to predict the measurements or records associated with part 5 passing through station4 given the past representations.

The machine learning systems described herein can take this data—represented in graphical form in FIG. 2—to estimate measurements of any particular part at any particular station. According to embodiments, unsupervised distribution estimation can be performed from a set of examples $(x_1, x_2, \ldots, x_n)$, each composed of variable length sequences of multimodal structural measurements occurring at a corresponding station $((m_1,s_1), \ldots, (m_k,s_k))$, where m is the measurement and s is the station. An example sequence x represents the manufacturing stations a product or part goes through in order of time. From the sequence modeling perspective, the joint probability of measurements at stations can be factorized as follows:

$$P(x) = \prod_{i=1}^{k} p(x_i | x_{<i}) = \prod_{i=1}^{k} p((m_1,s_1) | (m_1,s_1), \ldots ,(m_{i-1},s_{i-1})) \quad (1)$$

Learning such probability distribution allows easy queries to or sampling from models with subsequences: $P(x_{>32,i} | x_{<i})$.

The models disclosed herein allow the data to be viewed as a sequence from the station view. For example, referring again to FIG. 2, data from station2 can be modeled because data is captured sequentially at 9:00 (from part1), 9:10 (from part2), and 9:30 (from part4). By doing so, one can model the measurements taken from a particular station, and the variable being the particular part passing through the station. This may be important in environment where not every part goes through every station, and not every station measures each part (such as the example illustrated in FIG. 2). Therefore, the probability distribution P(x) modeled is dependent on all parts and corresponding measurements at stations that are included in the set x, prior to the actual occurrence of x. In other words, in order to estimate a measurement at a particular station of a particular part, the model uses as input the past temporal measurements taken of the parts and stations prior to the actual measurement at the particular station of the particular part being performed. Taking FIG. 2 as an example, the probability of part5's sequence depends on the measurements of part3 at station1; part1 and part3 at station3; part2 and part4 at station4; and part1, part2 and part4 at station2. Take part1 at station2 as an example. Part5's sequence is dependent on this node is because part5 at station3 is dependent on station3's latent state at timestamp 9:20, which encodes the subsequence of parts going through station3 before part5 arrives at station3. But part1 at station3 is dependent on part1's latent state at timestamp 9:05, which encodes (and hence depends on) the subsequence of part1 before it reaches station3, meaning part1's latent state at 9:05 is dependent on part1 at station2.

In order to reduce memory and computation consumption at training time, and to shorten inference time, the embodiments disclosed herein can use latent space to encode the subsequence of a part p's sequence x<1 into latent state $h^p_i=\text{Encoder}(x_{<i})$. This will further be described below with respect to batch processing. In an embodiment, an auto-regressive encoder is utilized, i.e., $h^p_i=h^p_{i-1}+\text{Encoder}(x_i)$. Similarly, the system can encode the station subsequence up to the $j^{th}$ part into the latent state $h^s_j$. Assuming part p is the $i^{th}$ part that gets measured by station $s_i$, the following equation can apply:

$$P(x)=\prod_{i=1}^{k} p(x_i|h^p_i, h^{s_i}_{i_p}) \qquad (2)$$

Figure 3:
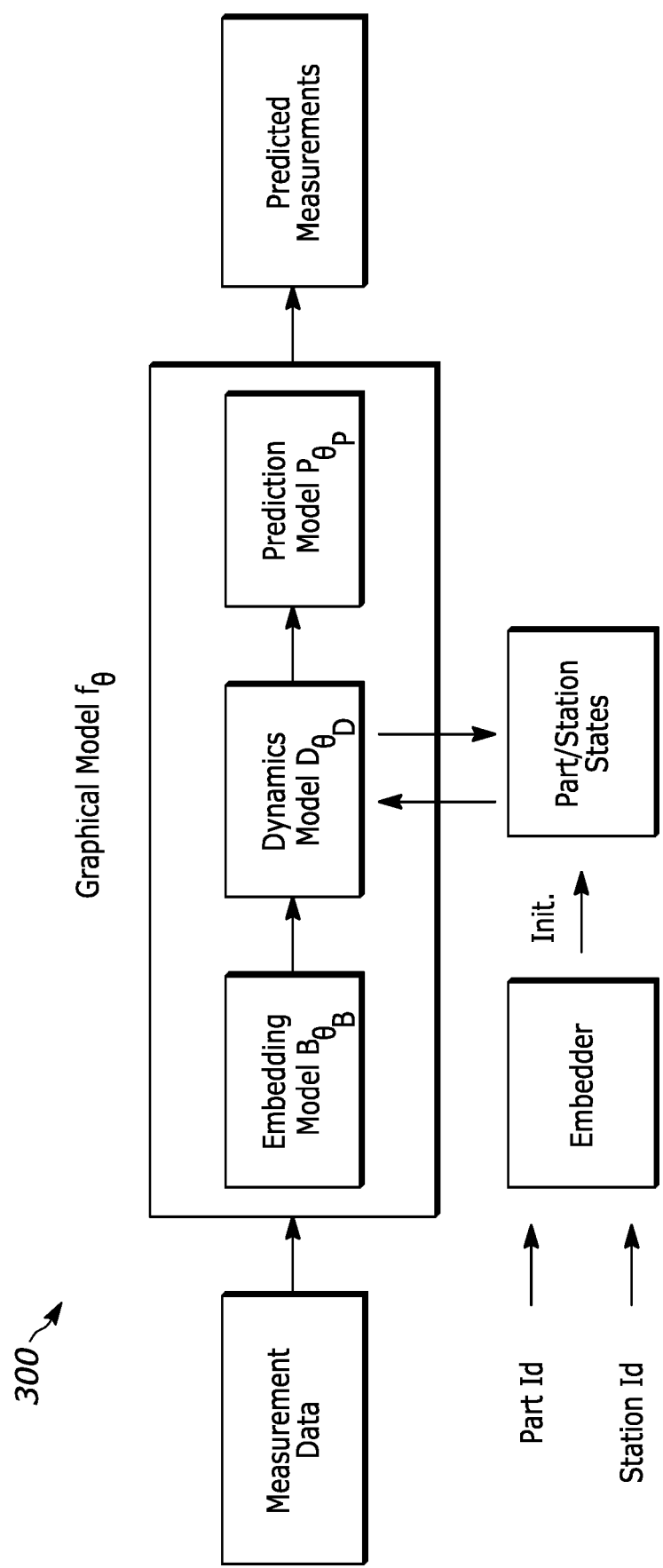
FIG. 3 shows a schematic diagram of a graphical machine learning model for predicting measurements of a particular part at a particular station based on actual part measurement data and latent space representation of a particular part and station, according to an embodiment.

FIG. 3 illustrates a machine learning model 300 being trained according to the descriptions provided herein for optimizing time-based sequential manufacturing data described herein. The machine learning model 300 may be an unsupervised auto-regressive graphical model, according to one embodiment. The machine learning model 300 models multimodal structured data including tabular, time series, and aggregate statistics on a multitype directed graph. Measurements or distribution of the measurements performed on a part at a station (also referred to as measurement data) are used as targets for training the model, and the encoded subsequences (i.e., latent space) of this part and station is used as input. These subsequences or dataset D can be a manufacturing multimodal sequence dataset, without annotations. Each part sequence in D contains the information relating to the type of part, an identifier of the part, the sequence of stations that this part goes through, and the measurements or records at each station. The measurements taken may be a binary value related to size or strength of the part, or a time series value such as a measurement of the part's response to pressure). Other examples of measurements taken include its friction qualities, weight distribution, density, presence of cracks or defects, and other measurements typically included in a manufacturing facility to assure a manufactured part is suitable for further assembly or production.

This measurement data is input into the graphical model $f_\theta$. The model includes three sub-models, or three separate machine learning models, according to an embodiment: an embedding model, a dynamics model, and a prediction model. Each of these machine learning models may neural networks or sub-networks in the form of a GNN, CNN, or the like.

Because embodiments of this system uses an auto-regressive encoder for part and station state information, an initialization is derived for both states when no measurements were observed. This receives attributers of the part, or attributes of the manufacturing station to generate an initial state of the part or station. An example would be a certain size dimension of a particular part before being subjected to action at a particular station.

The embedding model can be referred to as an embedding network or $B_{\theta_B}$, where B is the batch size (the batching process is described further below). This model is configured to embed a set of measurement data (e.g., of varying type described above, such as floating precision number, string, integer, Boolean, time series measurements, aggregation of statistics, etc.) into a float array or vector that the dynamics model can consume. Depending on the type of measurement data, the embedding model can have different architectures. For example, if the measurement data are all floating numbers or integers, B can simply be a multi-layer perceptron. In another example, if the measurement data includes time series data, a 1-dimensional convolutional network can be applied to extract the features.

The dynamics model can be referred to as a dynamics network or $D_{\theta_D}$, where again D can be a part/station subsequence dataset encoded into the latent space. Any time-series model with latent state can be used for this model, such as a recurrent neural network. Each part sequence in the dynamics model contains the information relating to the type of part, an identifier of the part, the sequence of stations that this part goes through. The input to the dynamics model can be the current embedded measurements ($x_i$) of equation (2) above, and current state of the part and station, i.e., $h^p_i, h^{s_i}_{i_p}$ of equation (2) above. The dynamics model includes the updated part and station state, i.e., $h^p_{i+1}, h^{s_i}_{i_p+1}$.

The prediction model can be referred to as a predicted network or $P_{\theta_P}$. The prediction model takes as input the part and station's latent state $h^p_i, h^{s_i}_{i_p}$ and predicts (1) measurements of part p at station $s_i$ ($x_i$), or (2) quantiled measurement if the measurement is float-valued. Predicting quantiled measurements allows the learned model to predict likelihoods of each quantile of the measurement distribution, and allows sampling from the model.

The output of the overall model $f_\theta$ is a predicted measurement, such as a prediction of one of the nodes in FIG. 2. The model $f_\theta$ can continue to operate until convergence, producing a trained machine learning model that can predict a measurement of a part based on the previous temporal measurements and the latent space representation of the manufactured part and station.

In the dynamics model, the manufactured part state and the station state of one node go into the dynamics model to produce a measurement, as well as update the states themselves. The dynamics model is configured to model the graph shown in FIG. 2, for example, from part1 to part5, and from station1 to station4. This is done with subsequence modeling, including modeling by taking latent space of the manufactured part and the station. So, referring to FIG. 2 as an example, the measurement data captured at 9:00 for part1, station2 is used to determine a predicted measurement of the node shown at part1, station 3 at 9:05. In particular, the latent state (either in its initialized state if not used before, or in its updated state after a previous measurement) of station3 is used to predict the measurement of part1 that would happen at 9:05. This produces a predicted measurement for part1 at station3. And, after producing each predicted measurement, the model can be updated and trained. Since the measurement data includes the real measurements, and the model produces a predicted measurement, the graphical model can derive a difference between the real measurement data and the predicted measurement. This difference between the actual measurement data and the predicted measurement can be used to update parameters of the graphical model to minimize the difference according to training methods described above. The process can then repeat, with continued steps to derive predicted measurements, compare the predicted measurements to the actual measurement data taken from a sensor, and use the difference between the actual and estimated measurements to update the model's parameters. This process can repeat until the model achieves a predetermined performance level (e.g., ~100% agreement between the predicted measurements and the actual measurement data), or convergence (e.g., a set number of iterations occurring, or that the difference is sufficiently small (e.g., the change in the approximate probability over iterations is changing by less than a threshold), or other convergence conditions).

Some manufacturing facilities may have a large number of stations, or many different types of parts being measured. This could lead to an exuberant amount of data. In order to train the neural networks described herein with such a large amount of data, the neural networks can be trained with samples of data. Processing all nodes temporally can be an enormous undertaking—e.g., obtaining measurement data at 9:00, then train the model, then predicting a measurement at 9:05, then comparing it to the actual measurement data at 9:05, then comparing the difference, then updating the model, and repeating this process for all nodes. It may be preferable to execute the machine learning model with at least some of the data (nodes) at the same time.

But training of the system requires an estimated measurement to be made independent of the actual measurement data, and the estimated measurement is affected by the previous measurements and estimations which update the model. So, referring to FIG. 2 as an example, the system may not be configured to be trained by predicting measurements for the node at part 1, station2 and part2, station2 at the same time—the predicted measurement at part2, station2 depends on the earlier model execution and actual data measurement of the node at part1, station2. In other words, the 9:00 node at part1, station2 is a parent to the 9:10 node at part2, station2. The model therefore processes the measurements of part1, station2, then updates the latent state of station2, and only then can process part2 at station2. It can therefore be said that since the machine learning model updates data at each node as it is executed, nodes that are located earlier in time being updated as the machine learning model is processing effect the later nodes being estimated, so all data points in the graph cannot be executed at the same time.

Therefore, the system can grab some nodes that are not dependent on one another in order to perform batch processing. For example, the node at part1, station2 and the node at part3, station1 are not dependent on each other; the measurements at each node will not affect the execution of the model at the other node. (In fact, these two nodes are timestamped identically at 9:00, although that is not a requirement for batch processing, but further illustrates that the two nodes are not dependent on each other.) The same can be said for the nodes at part1, station3 and at part2, station2. The use of batch processing can help reduce processor power output, memory limitations, and cost.

In a process referred to as standard batching, a dependency graph can be built, with each measurement connected to a previous measurement. The graph can be built based on parents and dependencies of nodes. For example, if a chosen node at part2, station2, the graph can be built looking backward in time from that station and part to see what parent nodes there are (e.g., what nodes would, if executed by the model for updating and training, affect the execution of the model at the chosen node). The immediate parents to the chosen node can be determined by traveling linearly upward (backward in time) along the vertical edge from the chosen node until another node is reached, and by traveling linearly to the left (backward in time) along the horizontal edge from the chosen node until another node is reached. Then the process can repeat, finding the immediate parents of those nodes, and so on, to build the graph. While traversing, the batching model can assign a chunk number $c_v$ to each node or vertex v, where v=max(chunk number of all v's parents)+1 if number of vertices in $c_v$ is less than batch size B; otherwise assign chunk number $c_v+1$ to v. Then, a batch will be a set of consecutive chunks. This ensures that all measurements or records are only processed after all the direct dependencies are met (e.g. both sequence of measurements associated with components visiting a station and sequence of measurements associated stations visited by a part are respected).

In another embodiment of batching, full part sequence batching can be utilized. While standard batching ensures all dependencies of a set of measurements are encoded beforehand, some part sequences are not loaded fully in a batch because of memory constraints and range of data collection (e.g., too many parts being produced in a short time frame). When a part sequence is not loaded fully in a batch, the dynamic model $D_{\theta_D}$ may only be optimize to the subsequences that are loaded. On the other hand, the station latent state may change with a slower dynamic than the part latent state, i.e., small changes to station state during the whole production time span of a part. Therefore, for each part in a standard batch that is included in the batch (but not its full part sequence), the system can add another batch in which full part sequences of such parts included. Referring to FIG. 4 for example, the batch may be constructed such that it includes all nodes or vertexes going upward until the first time that particular part is measured, such that the entire sequence of nodes for a particular part are included in the batching process.

Therefore, the training of the machine learning model shown in FIG. 3 can be performed with batching as follows. For all data samples in D, the system can assign a batch number or chunk number to each measurement set (e.g., a particular part at a particular station). For the $k^{th}$ batch, the system can load all measurement set with chunk numbers in the range of (k−1)*B to k*B into memory. If the system is using full sequence batching, the system can append a batch with full sequences after the B chunks. The system can use either the measurements (measurement data) or quantiled measurements as a target, and run each chunk in parallel through the graphical machine learning model $f_\theta$. Then, after all B chunks have done a forward pass through $f_\theta$, the system can update θ with the gradient of $f_\theta$ and update the part and station latent states, if the parts have not reached the end of their sequences. This is repeated through the whole dataset until convergence, or a predetermined number of epochs.

The neural network algorithms and/or methodologies of one or more embodiments described herein are implemented using a computing platform, such as the computing platform 400 illustrated in FIG. 4. The computing platform 400 may include memory 402, processor 404, and non-volatile storage 406. The processor 404 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 402. The memory 402 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 406 may include one or more persistent data storage devices such as a hard drive, optical drive, tape drive, non-volatile solid state device, cloud storage or any other device capable of persistently storing information.

The processor 404 may be configured to read into memory 402 and execute computer-executable instructions residing in embedding model 408 of the non-volatile storage 406 and embodying embedding algorithms and/or methodologies of one or more embodiments disclosed herein. The processor 404 may be further configured to read into memory 402 and execute computer-executable instructions residing in dynamics model 410 of the non-volatile storage 406 and embodying dynamics algorithms and/or methodologies described herein. The processor 404 may be further configured to read into memory 402 and execute computer-executable instructions residing in prediction model 412 of the non-volatile storage 406 and embodying prediction algorithms and/or methodologies described herein. The models 408-412 may include operating systems and applications. The models 408-412 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 404, the computer-executable instructions of the models 408-412 may cause the computing platform 400 to implement one or more of the neural network algorithms and/or methodologies disclosed herein. The non-volatile storage 406 may also include measurement data 414 and data 416 representing an identification of the part and station at each node, as described herein. The measurement data 414 can include data captured or taken from a sensor located at a particular station in the manufacturing process. The sensor may be an image sensor, laser measurement sensor, or any other type of sensor configured to yield data representing a physical quality, state, or characteristic of the part being measured.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of training a machine learning model with measurement data captured during a manufacturing process, the method comprising:
    receiving measurement data regarding a physical characteristic of a plurality of manufactured parts as measured by a plurality of sensors at various manufacturing stations;
    via a time-series dynamics machine learning model, encoding the measurement data into a latent space having a plurality of nodes, each node associated with the measurement data of one of the manufactured parts as measured at one of the manufacturing stations;
    via a prediction machine learning model, determining a predicted measurement of a first of the manufactured parts at a first of the manufacturing stations based on the latent space of at least some of the measurement data not including the measurement data corresponding to the first manufactured part at the first manufacturing station;
    via the machine learning model, comparing the prediction measurement of the first manufactured part to the measurement data of the first manufactured part at the first manufacturing station;
    based on a difference between the prediction measurements and the actual measurement data, updating parameters of the machine learning model until convergence; and
    based upon the convergence, outputting a trained machine learning model with the updated parameters.

2. The computer-implemented method of claim 1, further comprising:
    batching the measurement data for processing by the prediction machine learning model, wherein the batching includes building a batch of nodes that are immediately connected to a first node via an edge and timestamped prior to the first node.

3. The computer-implemented method of claim 2, wherein the step of predicting is performed on the batch of nodes.

4. The computer-implemented method of claim 2, wherein the batching further includes selecting additional nodes for the batch, wherein the additional nodes include all nodes associated with the first manufactured part timestamped prior to the first node.

5. The computer-implemented method of claim 4, wherein the additional nodes do not include all nodes associated with the first manufacturing station timestamped prior to the first node.

6. The computer-implemented method of claim 1, wherein the measurement data is multimodal measurement data, and the predicted measurement is a multimodal predicted measurement.

7. The computer-implemented method of claim 1, further comprising:
utilizing an embedding neural network to embed the measurement data into an array configured for execution by the time-series dynamics machine learning model.

8. A system of training a machine learning model with measurement data captured during a manufacturing process, the system comprising:
a plurality of sensors located at a plurality of manufacturing stations, each sensor configured to produce measurement data indicating a physical characteristic of a plurality of manufactured parts passing through a respective one of the manufacturing stations,
at least one processor programmed to:
execute a time-series dynamics machine learning model to encode the measurement data into a latent space having a plurality of nodes, each node associated with the measurement data of one of the manufactured parts as measured at one of the manufacturing stations,
execute a prediction machine learning model to determine a predicted measurement of a first of the manufactured parts at a first of the manufacturing stations based on the latent space of at least some of the measurement data not including the measurement data corresponding to the first manufactured part at the first manufacturing station,
compare the prediction measurement of the first manufactured part to the measurement data of the first manufactured part measured at the first manufacturing station,
based on a difference between the prediction measurements and the actual measurement data, updating parameters of the machine learning model until convergence, and
based upon the convergence, output a trained machine learning model with the updated parameters.

9. The system of claim 8, wherein the at least one processor is further programmed to:
build a batch of the measurement data for processing by the prediction machine learning model, wherein the batch includes selected nodes that are immediately connected to a first node via an edge and timestamped prior to the first node.

10. The system of claim 9, wherein the at least one processor is further programmed to execute the predicting machine learning model with the batch of nodes.

11. The system of claim 9, wherein the building of the batch further includes selecting additional nodes for the batch, wherein the additional nodes include all nodes associated with the first manufactured part timestamped prior to the first node.

12. The system of claim 11, wherein the additional nodes do not include all nodes associated with the first manufacturing station timestamped prior to the first node.

13. The system of claim 8, wherein the measurement data is multimodal measurement data, and the predicted measurement is a multimodal predicted measurement.

14. The system of claim 8, wherein the at least one processor is further programmed to:
execute an embedding neural network to embed the measurement data into an array configured for execution by the time-series dynamics machine learning model.

15. A computer-implemented method of training a machine learning model with measurement data captured during a manufacturing process, the method comprising:
receiving measurement data regarding a physical characteristic of a plurality of manufactured parts as measured by a plurality of sensors at various manufacturing stations;
via a time-series dynamics machine learning model, encoding the measurement data into a latent space having a plurality of nodes, each node associated with the measurement data of one of the manufactured parts as measured at one of the manufacturing stations;
batching the measurement data to build a batch including a first plurality of nodes that are immediately connected to a first node via first edges and measured in time earlier than the first node, and a second plurality of nodes wherein each of the second plurality of nodes are immediately connected to, and measured in time earlier than, a respective one of the first plurality of nodes via second edges; and
via a prediction machine learning model, determining a predicted measurement of a first of the manufactured parts at a first of the manufacturing stations based on the latent space of the batch of nodes.

16. The computer-implemented method of claim 15, further comprising:
via the machine learning model, comparing the prediction measurement of the first manufactured part to the measurement data of the first manufactured part at the first manufacturing station;
based on a difference between the prediction measurements and the actual measurement data, updating parameters of the machine learning model until convergence; and
based upon the convergence, outputting a trained machine learning model.

17. The computer-implemented method of claim 16, wherein the batching further includes selecting additional nodes for the batch, wherein the additional nodes include all nodes associated with the first manufactured part measured in time prior to the first node.

18. The computer-implemented method of claim 17, wherein the additional nodes do not include all nodes associated with the first manufacturing station measured in time prior to the first node.

19. The computer-implemented method of claim 16, wherein the measurement data is multimodal measurement data, and the predicted measurement is a multimodal predicted measurement.

20. The computer-implemented method of claim 15, further comprising:
utilizing an embedding neural network to embed the measurement data into an array configured for execution by the time-series dynamics machine learning model.

* * * * *